(12) United States Patent
Lee

(10) Patent No.: US 8,504,829 B2
(45) Date of Patent: Aug. 6, 2013

(54) CERTIFICATION SYSTEM IN NETWORK AND METHOD THEREOF

(75) Inventor: Jae Jun Lee, Seoul (KR)

(73) Assignee: NHN Corporation, Seongnam-si (KR)

( * ) Notice: Subject to any disclaimer, the term of this patent is extended or adjusted under 35 U.S.C. 154(b) by 1697 days.

(21) Appl. No.: 11/510,391

(22) Filed: Aug. 25, 2006

(65) Prior Publication Data

US 2007/0055866 A1  Mar. 8, 2007

Related U.S. Application Data

(63) Continuation of application No. PCT/KR2005/000535, filed on Feb. 25, 2005.

(30) Foreign Application Priority Data

Feb. 26, 2004  (KR) .................. 10-2004-0013024

(51) Int. Cl.
*H04L 29/06* (2006.01)
(52) U.S. Cl.
USPC .................. 713/168; 713/170; 713/175
(58) Field of Classification Search
USPC ............ 713/155–159, 168–181; 726/21; 705/53, 67, 75–79
See application file for complete search history.

(56) References Cited

U.S. PATENT DOCUMENTS

| | | | | |
|---|---|---|---|---|
| 2002/0010756 A1* | 1/2002 | Oku | ............................. | 709/217 |
| 2003/0097444 A1* | 5/2003 | Dutta et al. | ................... | 709/225 |
| 2005/0154913 A1* | 7/2005 | Barriga et al. | ................ | 713/201 |

FOREIGN PATENT DOCUMENTS

| | | |
|---|---|---|
| JP | 2001331449 | 11/2001 |
| JP | 2002-335239 | 11/2002 |
| JP | 2003-198537 | 7/2003 |
| KR | 10-2004-001118 A | 2/2004 |

OTHER PUBLICATIONS

International Search Report and Written Opinion of ISA dated May 24, 2005 for PCT/KR2005/000535 filed on Feb. 25, 2005.

* cited by examiner

*Primary Examiner* — Edward Zee
*Assistant Examiner* — Chi Nguy
(74) *Attorney, Agent, or Firm* — H.C. Park & Associates, PLC

(57) ABSTRACT

A certification system connected to a radio communication system which includes a device configured to perform a first certification based on first information received via the radio communication system from a radio terminal. A first access server is connected to a first network and to the radio network and the first access server is configured to acquire the first information and to perform a second certification based on second information received via the radio network from the radio terminal. The first access server also selectively provides information requested by the radio terminal to the radio terminal based on the second information.

21 Claims, 6 Drawing Sheets

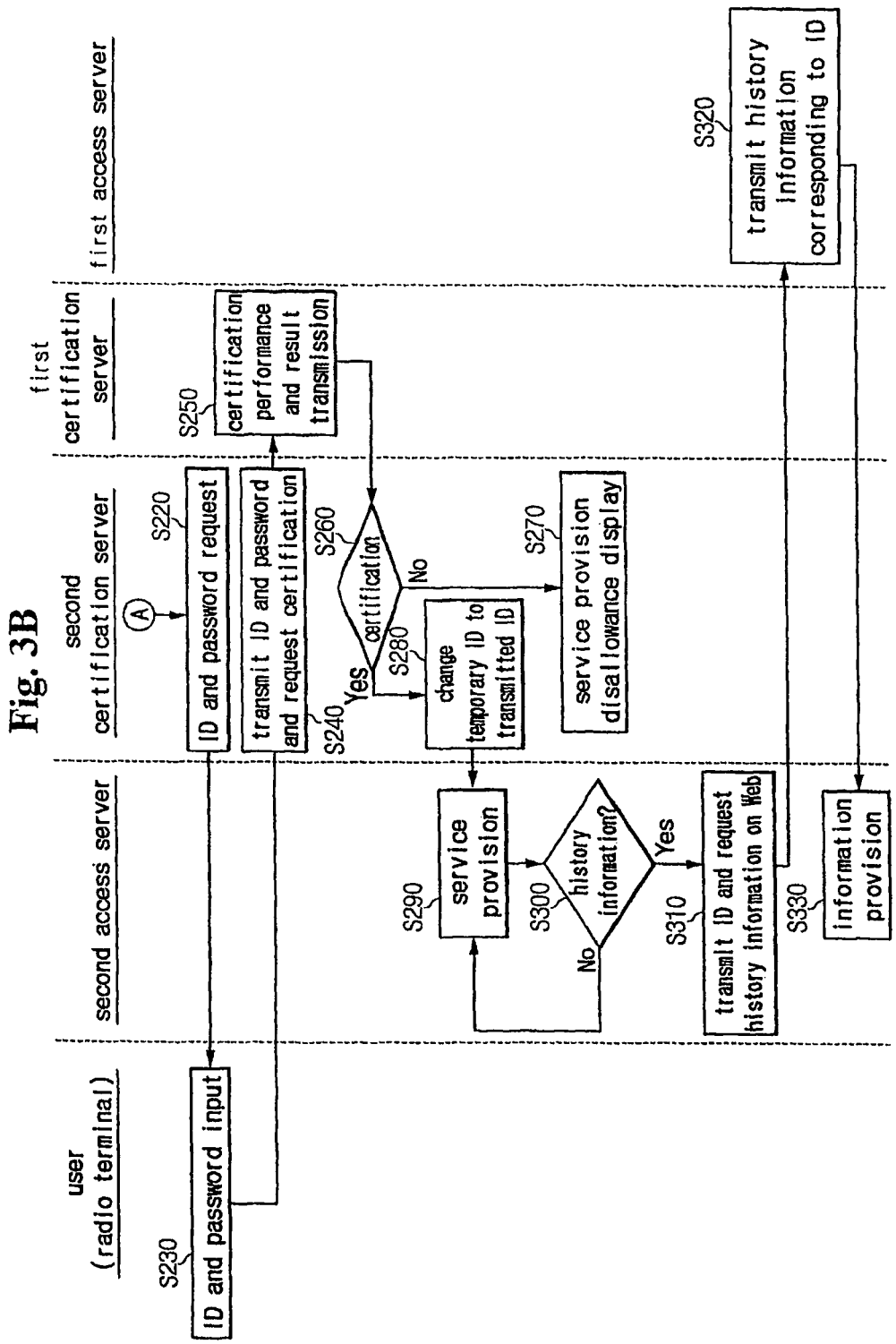

Fig. 4A membership database

| resident number 1 | address of site 1 | ID 1 | password 1 |
|---|---|---|---|
| | address of site 2 | ID 2 | password 2 |
| resident number 2 | address of site 1 | ID 3 | password 3 |
| | address of site 2 | ID 3 | password 3 |
| | address of site 3 | ID 4 | password 4 |

⋮

Fig. 4B first log database

| ID 1 | address of site 1 | history information 1 |
|---|---|---|
| ID 2 | address of site 2 | history information 2 |
| ID 3 | address of site 1 | history information 3 |
| | address of site 2 | history information 4 |
| ID 4 | address of site 3 | history information 5 |

⋮

CERTIFICATION SYSTEM IN NETWORK AND METHOD THEREOF

CROSS-REFERENCE TO RELATED APPLICATIONS

This application is a continuation of PCT/KR2005/000535, filed Feb. 25, 2005, which claims the benefit of Korean Patent Application No. 10-2004-0013024 filed Feb. 26, 2004. The disclosures of these prior applications are considered part of, and are incorporated by reference herein, the disclosure of this application.

BACKGROUND OF THE INVENTION (a) Field of the Invention

This invention relates to a certification system and a method thereof, and more particularly to a system of certifying a user accessing the system over a radio network and a method thereof.

(b) Description of the Related Art

With the recent rapid spread of the Internet all over the world, various types of electronic commerce for the entire world through a homogeneous medium called the Internet have been developed and used. Generally, the electronic commerce includes a series of activities including commercial transactions involving movement of funds as well as customer-oriented marketing, advertising, procurement, service, contents provision, manufacture, transportation, purchases, and the like using electronic media, electronic techniques, and means under circumstances of automatic information systems integrated among enterprise-to-enterprise, enterprise-to-personal, personal-to-personal, or government-to-enterprise transactions.

With the development of information and communications technologies, electronic commerce through the radio (wireless) Internet as well as the wired Internet is being increasingly activated. Electronic commerce through the radio Internet is being even more activated with a merit that customers can acquire desired information anytime and anywhere. With the active use of the radio Internet, services enabling acquisition of information on commercial transactions on the wired Internet or personal information such as mail information through the radio Internet are being provided to customers.

A user who wants to use a personal information reading service is typically required to be registered as a member in a system providing the service, and thereafter, the user can use the service only when he is certified to be the member of the system. Generally, when the user provides a user identification number (for example, an ID or the like) and a password to the system, the system may allow the user to use the service based on a determination on whether the information provided by the user is coincident with pre-stored information.

However, since the user can be certified based on only the ID and password provided by the user, an unauthorized person may not be prevented from using the ID and password of the user by stealth for the purpose of using the service. Particularly in the case of charged services, pecuniary damage to the user may occur due to an illegal act of the unauthorized person.

SUMMARY OF THE INVENTION

According to the present invention, user certification can be more safely performed through a network.

According to the present invention, particularly, various historical information on users using services provided through different networks is mutually linked, and certification of the users using the history information is performed with safety.

According to an aspect of the present invention, there is provided a certification system connected to a mobile communication service system via a network for performing certification for a user accessing the certification system through the network, the certification system including a first access server for performing an access process for the user accessing the certification system through a first network; a second access server for performing certification for the user accessing the certification system through a second network; a first certification server for performing certification for the user accessing the certification system through the first network; and a second certification server for performing certification for the user accessing the certification system through the second network. The second certification server includes a second certifying unit for acquiring first identification information and an identification number of a radio terminal of the user from the radio terminal of the user accessing the certification system through the second network, and transmitting the first identification information and the identification number to the mobile communication service system to perform primary certification, and a second certifying unit for acquiring second identification information from the radio terminal of the user and transmitting the second identification information to the first certification server to perform secondary certification. The second access server selectively provides information requested by the radio terminal of the user to the radio terminal of the user based on the second identification information of the user provided from the second certification server in conjunction with the first access server.

According to another aspect of the present invention, there is provided a certification method of a certification system connected to a mobile communication service system through a network for performing certification for a user accessing the certification system through first and second networks, the method comprising a) receiving first identification information of the user and an identification number of a radio terminal of the user from the user accessing the certification system through the second network and requesting the certification system to provide a service; b) transmitting the first identification information and the identification number of the radio terminal to the mobile communication service system and requesting the mobile communication service system to perform primary certification for the user; c) receiving second identification information from the user and performing secondary certification for the user; and d) providing a service requested by user to the radio terminal of the user who accessed the certification system through the second network after the primary and secondary certifications are performed.

BRIEF DESCRIPTION OF THE DRAWINGS

FIGS. 3A and 3B are flow charts illustrating a certification method according to an embodiment of the present invention;

FIGS. 4A and 4B are exemplary diagrams of data stored in a membership database and a first log database according to another embodiment of the present invention.

DETAILED DESCRIPTION OF THE PREFERRED EMBODIMENTS

Hereinafter, preferable embodiments of the present invention will be described in detail with reference to the accompanying drawings so that the present invention can be easily practiced by those skilled in the art. However, the present invention may be implemented in other various ways without being limited to the following embodiments.

In a certification system according to an embodiment of the present invention, history information on all activities (for example, transmission/receipt of e-mail, purchase of goods, settlement of accounts, etc.) performed by a user who has accessed a system over a first network and a second network is mutually linked and provided to the user. To achieve such a mutual linkage and provision of the information, the certification includes primary and secondary certifications for the user to ensure safe user certification in conjunction with a mobile communication service system.

For example, assuming the first network is a wired Internet (called "Web" here for convenience) and the second network is a wireless network (called "WAP" (wireless application protocol) here for convenience), the user can access the system through the WAP to receive the history information generated on the Web. To this end, the certification system according to the embodiment of the present invention provides first identification information (for example, a resident registration number, an identification number of a mobile terminal, etc), which is provided from the user accessing the certification system through the WAP, to the mobile communication service system to perform the primary certification, and then, transfers second identification information (for example, ID, a password, etc., which is granted on the Web for access to the certification system), which is provided from the user, to a server to perform the secondary certification of the Web.

When it is determined that the user is an authorized person by the primary and secondary certifications, the certification system provides the history information on the Web to the user. Accordingly, the user is provided with, for example, a service of opening personal information such as mail, a general contents service including payment methods, etc., through the WAP. Particularly, in the embodiment of the present invention, if the user is required to make a payment, the payment can be processed using a settlement account issued to the user on the Web.

The primary and secondary certifications performed in the certification system, although classified for the sake of convenience of explanation in this embodiment, are intended not to be limited in sequence. That is, the secondary certification may be performed after the primary certification is performed, and vice versa.

Next, based on such a concept, structure and operation of the certification system through the network according to the embodiment of the present invention will be described in detail.

Figure 1:
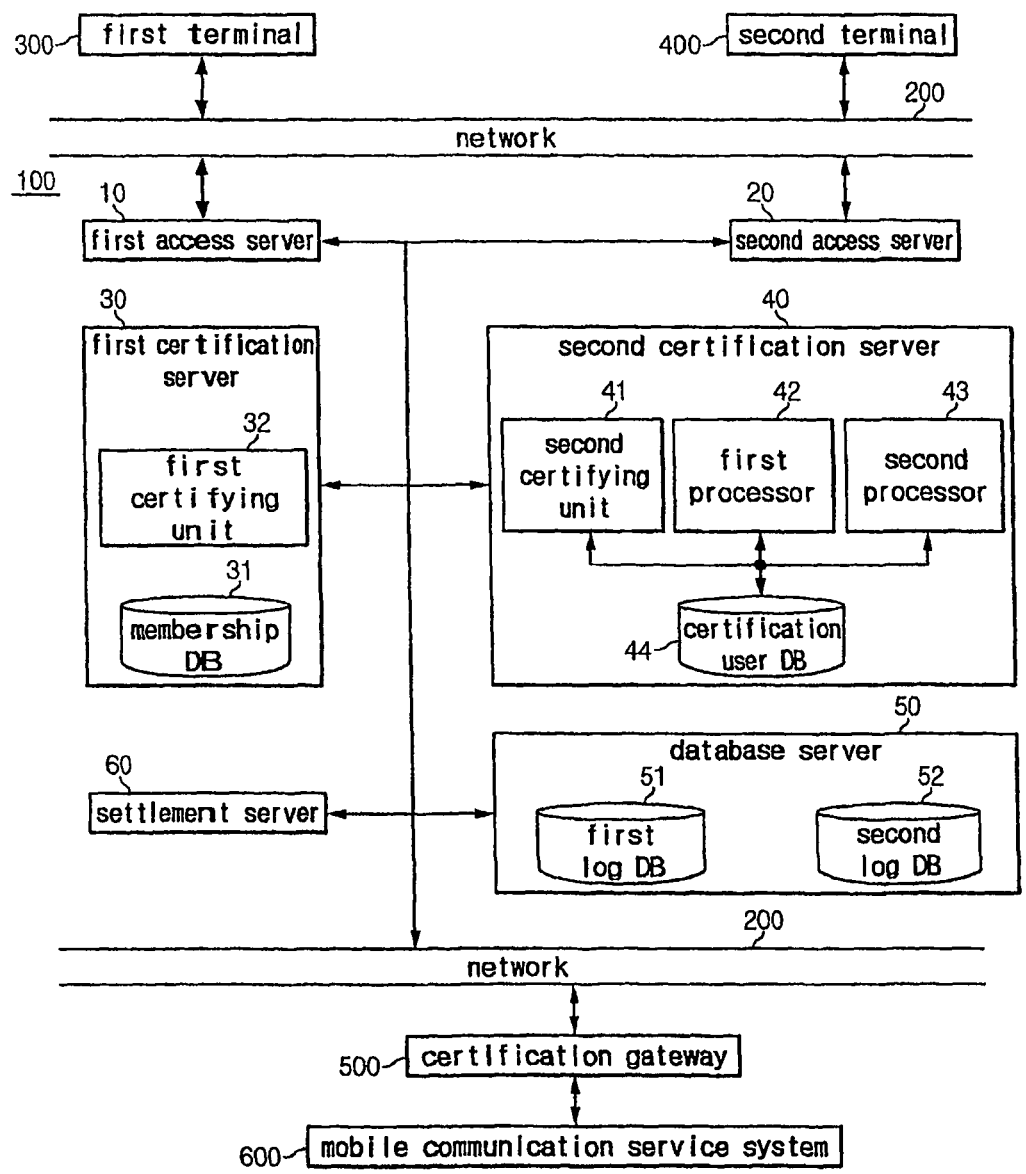
FIG. 1 is a structural view of a certification system in a network according to an embodiment of the present invention.

FIG. 1 shows a structure of the certification system according to the embodiment of the present invention.

Referring to FIG. 1, the certification system 100 according to the embodiment of the present invention is connected to a plurality of user terminals 300 and 400 through a network 200 (including various types of networks such as a telephone network, a wired Internet, a radio communication network, etc.). In addition, the certification system 100 is connected to a mobile communication system 600. In this case, a separate server of a security certification service provider, i.e., a certification gateway 500, may be connected between the certification system 100 and the mobile communication system 600.

The user terminal 300 is a communication device accessible to the certification system 100 through the network 200, including a wired terminal, a radio terminal, a computer, an Internet accessible TV, etc. Accordingly, users can access the certification system 100 conveniently and promptly using PC communication, a wired Internet, a telephone network, etc. Herein, for the sake of convenience of explanation, the wired terminal of the user is called a first terminal 300 and the radio terminal is called a second terminal 400.

The certification system 100 connected to the terminals 300 and 400 includes first and second access servers 10 and 20, first and second certification servers 30 and 40, a database server 50, and a settlement server 60.

The first access server 10 performs an access process for the users accessing the certification system 100 through the wired Internet (the first network). The first access server 10 may be called a Web server. The second access server 20 performs an access process for the users accessing the certification system 100 through the radio Internet (the second network). The second access server 20 may be called a WAP server.

The first certification server 30 performs a certification process for the users accessing the certification system 100 through the first access server 10. To this end, the first certification server 30 includes a membership database 31 in which information on members, that is, users to whom a service can be provided by the certification system 100, is stored, and a first certifying unit 32 for performing certification for the users accessing the certification system 100 through the first access server 10 based on the information stored in the membership database 31. Information (IDs, passwords, resident registration numbers, etc.) on users registered as members in the certification system 100 (registration users) can be stored in the membership database 31.

The second certification server 40 performs a certification process for the users accessing the certification system 100 through the second access server 20. To this end, the second certification server 40 includes a second certifying unit 41 for performing certification for the users accessing the certification system 100 through the second access server 20, a first processor 42 for selectively granting temporary identification codes to the users, a second processor 43 for changing the temporary identification codes of the users to formal identification codes, and a certification user database 44 in which information on certified users is stored.

The second certifying unit 41 performs certification in conjunction with the mobile communication system 600 based on radio telephone numbers of the radio terminals of the users and resident registration numbers of radio terminal subscribers, which are provided from the second access server 20. In addition, the second certifying unit 41 performs the first certification for the users accessing the certification system through the second access server 20 and then transfers additional information, which is provided from the users, to the first certification server 30 for performing the secondary certification for the user.

On the other hand, information on the certified users is stored in the certification user database 44, for example, the resident registration numbers as first identification information of the users (hereinafter abbreviated to resident numbers), the identification numbers of the radio terminals, which are matched with the resident numbers, etc. The identification numbers are the radio telephone numbers of the radio terminals, however they may be different identification numbers granted to the radio terminals. In addition, IDs of the users corresponding to the resident numbers and the identification numbers can be stored in the certification user database 44. In this case, the IDs may be formal IDs granted to the users when they join in membership or temporary IDs temporality granted to the user by the certification system 100.

On the other hand, the database server 50 includes a first log database 51 in which the history information on the users accessing the certification system 100 through the first network is stored, and a second log database 52 in which the history information on the users accessing the certification system 100 through the second network is stored.

The history information on the users is stored in the first and second log databases 51 and 52 for each user ID. Here, the history information is information on all activities performed by the users who have accessed the certification system 100, for example, transmitted/received information registered in a mail account, information on goods purchased, settlement information, etc. The settlement information may contain information on settlement accounts in which cyber money is accumulated, details of the cyber money accumulation, details of payments, etc.

The settlement server 60 performs settlement for a charged service provided to the users who have accessed the certification system 100 through the first access server 10 or the second access server 20. Particularly, in this embodiment, the settlement server 60 performs settlement using a settlement account provided by the certification system 100 by request of the users. The settlement account may be granted for each user and may store cyber money and the like provided by the certification system 100.

In the certification system, as constructed above, according to the embodiment of the present invention, the servers 10 to 60 are servers classified based on their functions and are changeable in various ways without limitation. For example, all of the databases may be contained in the database server 50, or the first and second certification servers 30 and 40 may be integrated into a single certification server. In addition, the first or second access server 10 or 20 may contain the first or second certification server 30 or 40 and the database server 50, or the first and second access server 10 and 20 may contain the first certification server 30 and the database server 50, respectively.

In addition, the first or second certification servers 30 or 40 may selectively contain the above-mentioned elements as needed, or the elements may be configured as separate servers for processing relevant functions. In addition, the second certifying unit 41, the first processor 42, and the second processor 43 are not limited to the classification as described above.

Next, based on the structure as constructed above, operation of the certification system according to embodiments of the present invention will be described.

Figure 2:
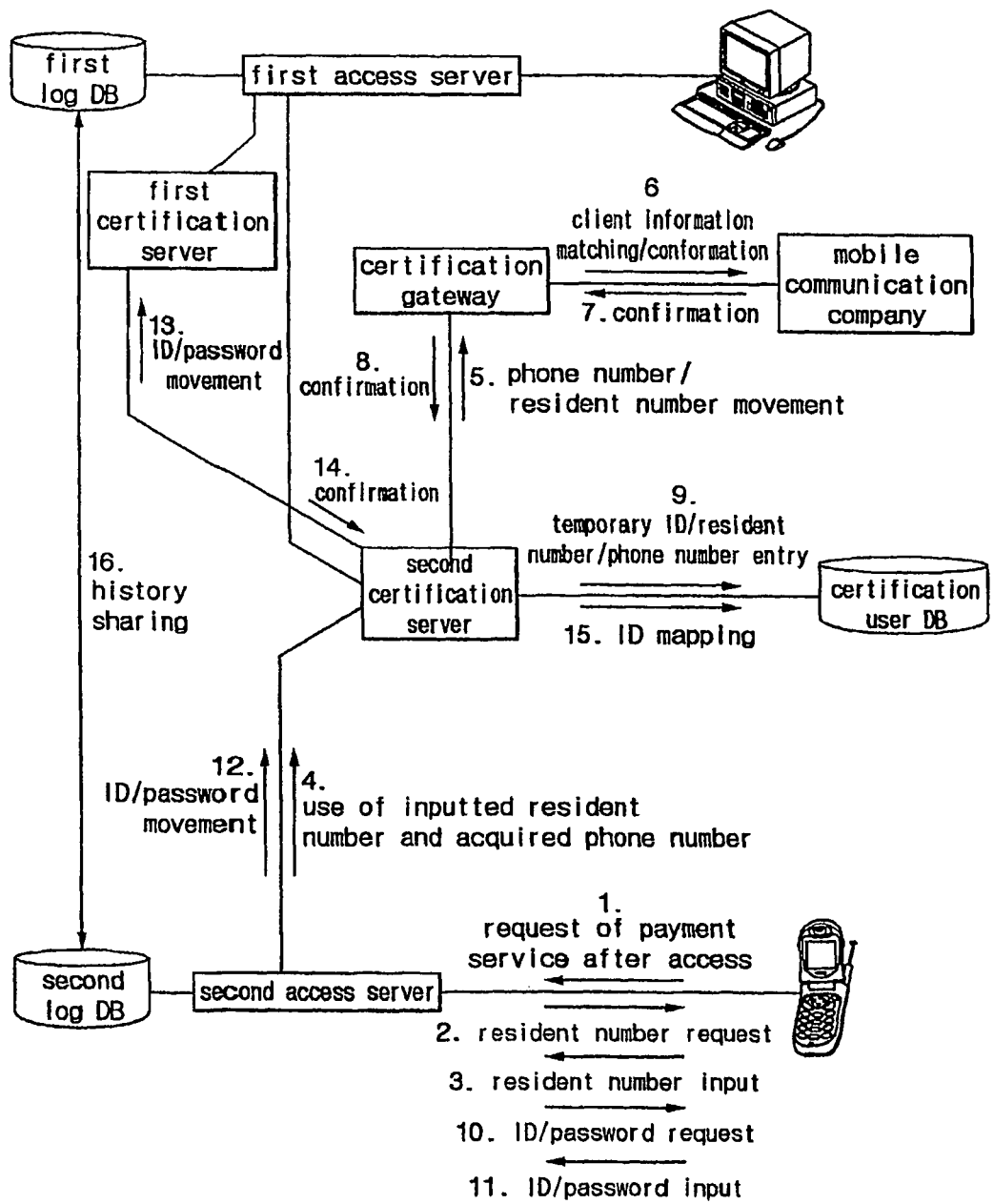
FIG. 2 is a diagram illustrating an example of operation of each server in a certification process according to an embodiment of the present invention.
Figure 3A:
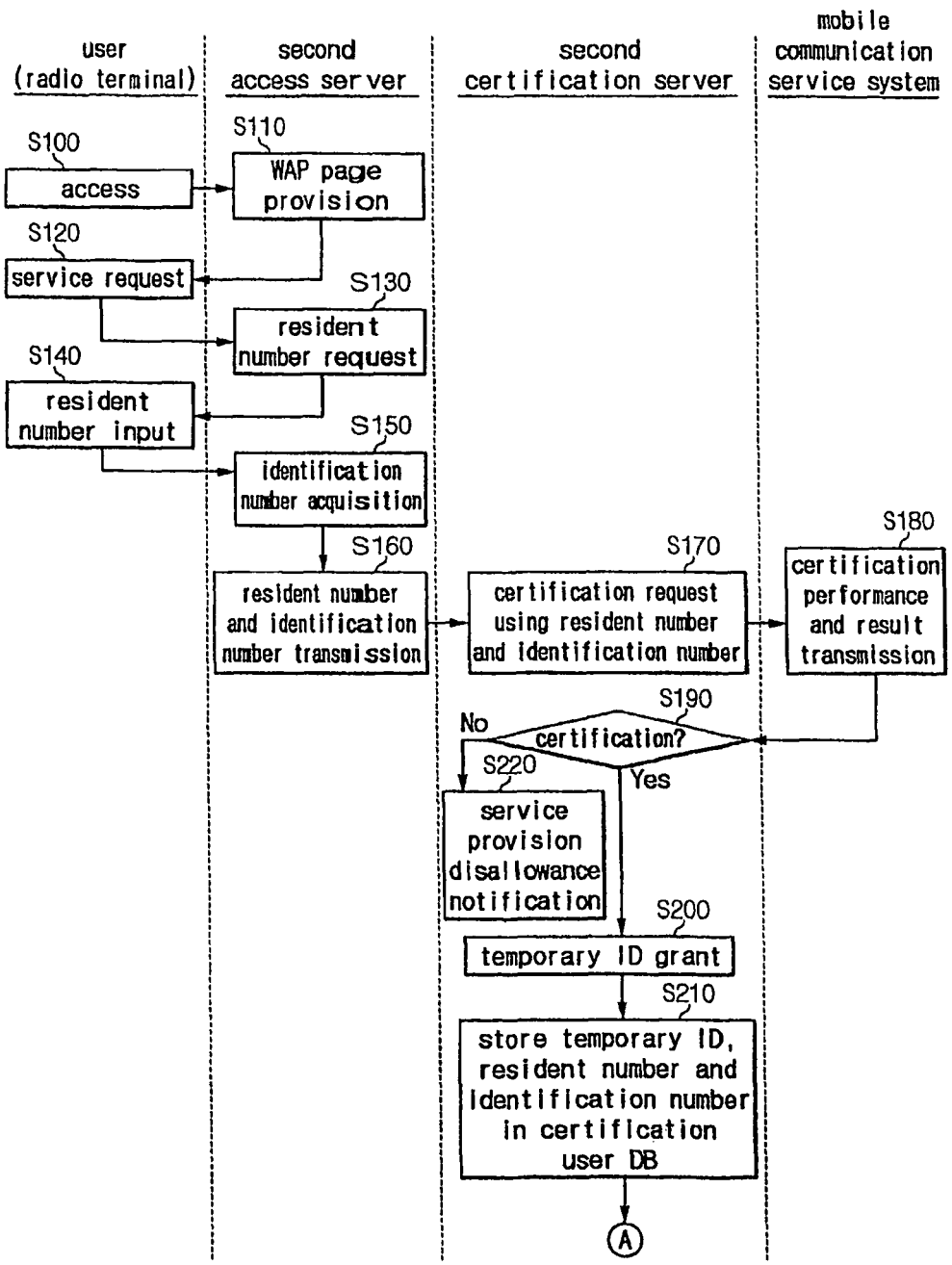

FIG. 2 illustrates an example of operation of each server in a certification process according to an embodiment of the present invention, and FIGS. 3A and 3B illustrate the certification method according to the embodiment, sequentially.

First, it is assumed that a user who accesses the certification system 100 through the first network, that is, the Web, and then is registered as a member in the certification system 100, wishes to receive a service through the second network, that is, the WAP.

In this case, as shown in FIG. 3A, the user drives a program (for example, a WAP browser or the like) for access to the radio Internet in the radio terminal 400 and then enters a URL (uniform resource location) for access to the certification system 100. This URL information is transmitted to the mobile communication service system 600 via the WAP gateway. Based on the URL information, the mobile communication service system 600 connects the radio terminal of the user to the certification system 100. When the connection is established between the certification system 100 and the radio terminal 400 of the user, the second access server 20 transmits a WAP page to the radio terminal 400 to allow the user to use the radio Internet (Steps S100 and S110).

Thereafter, when a payment service is requested, the second access server 20 receives identification information, that is, the resident number, from the user to certify whether the user is an authorized person (Steps 120 to S140). That is, the second access server 20 requests the radio terminal 400 to input the resident number.

Next, the second access server 20 acquires the identification number of the radio terminal of the user (Step S150) and then transmits the acquired identification number and the resident number to the second certification server 40, and requests the second certification server 40 to perform the certification for the user (Step S160). Generally, as communication between the radio terminal and the certification system is established based on the identification number of the radio terminal, the identification number and additional information inputted by the user are automatically contained in all messages transmitted from the radio terminal to the certification system. Accordingly, the second access server 20 can easily acquire the identification number from the messages provided from the radio terminal 400. This process is obvious to those skilled in the art, and therefore a detailed explanation thereof will be omitted for the purpose of brevity of description.

The second certifying unit 32 of the second certification server 30 provides the received resident number and identification number to the mobile communication service system 600, and requests the system 600 to perform the certification for the user (Step S170). Based on the database in which the information on the users using radio communication of the mobile communication service system 600 is stored, the mobile communication service system 600 determines whether the resident number stored in correspondence to the received identification number is coincident with the resident number received from the second certification server 40, and then transmits a result of the determination to the second certification server 40 (Step S180).

At this time, if the mobile communication service system 600 determines that the stored resident number is coincident with the resident number inputted by the user, to ensure reliability of the certification, that is, in order to ascertain whether the certified user is a real owner of the radio terminal, the second certifying unit 41 of the second certification server 40 transmits a certification message to the radio terminal having the identification number inputted by the user through the mobile communication service system 600 and requests the user to input the certification message transmitted to the radio terminal. In this case, an SMS (short message service) certification process for determining whether the user is the authorized person depending on whether the transmitted certification message is coincident with the inputted certification message is performed. The SMS certification process serves to prevent an unauthorized person from using the identification number of the radio terminal and the resident number of the authorized user by stealth. Such an SMS certification process may be optional.

After performing such a certification process, the first processor 42 of the second certification server 40 grants a temporary ID to the user and then stores the inputted resident number and identification number in the certification user database 44 in correspondence to the temporary ID (Step S190~S210). On the other hand, when a message of "not certified" is sent from the mobile communication service system 600 as it is determined in Step S190 that the inputted resident number is not coincident with the stored resident number, the second certifying unit 41 of the second certification server 40 informs the radio terminal 400 of the user of certification disallowance through the second access server 20 (Step S220).

Next, as shown in FIG. 3B, although the primary certification is performed through the mobile communication service system as described above, in order to further improve security without directly providing a service to the user, the second certifying unit 41 of the second certification server 40 additionally requests the radio terminal 400 of the user to input the ID and password granted by the certification system 100 (Step S220). When the second certifying unit 41 receives the ID and password from the radio terminal 400 of the user, it transmits the received ID and password to the first certification server 30 for performing the certification on the Web and requests the certification server 30 to perform the certification for the user (Step 230 and S240).

According to the request for the certification, based on the transmitted ID and password, the first certifying unit 32 of the first certification server 30 searches the membership database 31 to determine whether there is a coincident ID and password in the database 31, and then transmits a result of the determination to the second certifying unit 41 (Step S250).

If it is determined that the ID and password inputted by the user are not present in the membership database 31, the second certifying unit 41 of the second certification server 40 informs the user that a service is not allowed to be provided to him (Step S260 and S270). On the contrary, if it is determined that the ID and password inputted by the user are present in the membership database 31, the user is considered to be an authorized person, thereby providing a relevant service. Specifically, the second certifying unit 41 transmits the user ID to the second processor 42, and then the second processor 42 changes a temporary user ID stored in the certification user database 44 to the transmitted user ID and provides the transmitted user ID to the second access server 20 (Step S280). Accordingly, based on the ID provided from the second certification server 40, the second access server 20 finds the history information stored in the first and second log databases 51 and 52 and provides the found history information to the user (Step S290). More specifically, the second access server 20 provides the user ID to the first access server 10 and requests the first access server 10 to provide the history information. Then, when the history information stored in the first log database 51 in correspondence to the user ID is transmitted from the first access server 10 to the second access server 20, the second access server 20 provides the history information stored In the second log database 52 in correspondence to the user ID.

In this manner, according to this embodiment of the present invention, since the settlement is performed using settlement account information on the Web after the primary and secondary certifications are performed, unauthorized users can be prevented from using a service on the WAP.

On the other hand, in addition to the settlement using the settlement account, when the user requests a settlement using a radio telephone number, the second access server 20 provides the radio telephone number of the user and details of settlement to the mobile communication service system 600, requesting the system 600 to perform the settlement. Accordingly, a bill for the radio telephone number, along with a bill for the service provided through the WAP, may be issued in the future.

In addition, in this embodiment, Step S200 where the primary certification is performed in conjunction with the mobile communication service system 600, the temporary ID is granted to the user, and then the temporary ID is stored in the certification user database 44, and Step S280 where the secondary certification is performed through the first access server 10 and then the temporary ID is changed to the user ID, may be optionally performed.

On the other hand, in this embodiment, even when the user joins as a member in a plurality of web sites, history information at the web sites can be provided to the user accessing the certification system through the WAP. In this case, addresses of the web sites in which the user join as the member and IDs and passwords at the web sites are stored in the membership database 31 in correspondence to the user identification number (for example, the resident number), and history information on activities in the web sites is stored in the first log database 51 in correspondence to the IDs. FIG. 4A shows data stored in the membership database 31 and FIG. 4B shows data stored in the first log database 51. Unlike examples shown in FIGS. 4A and 4B, the first log database may be a plurality of separate databases in which the history information is stored for each web site.

Figure 5:
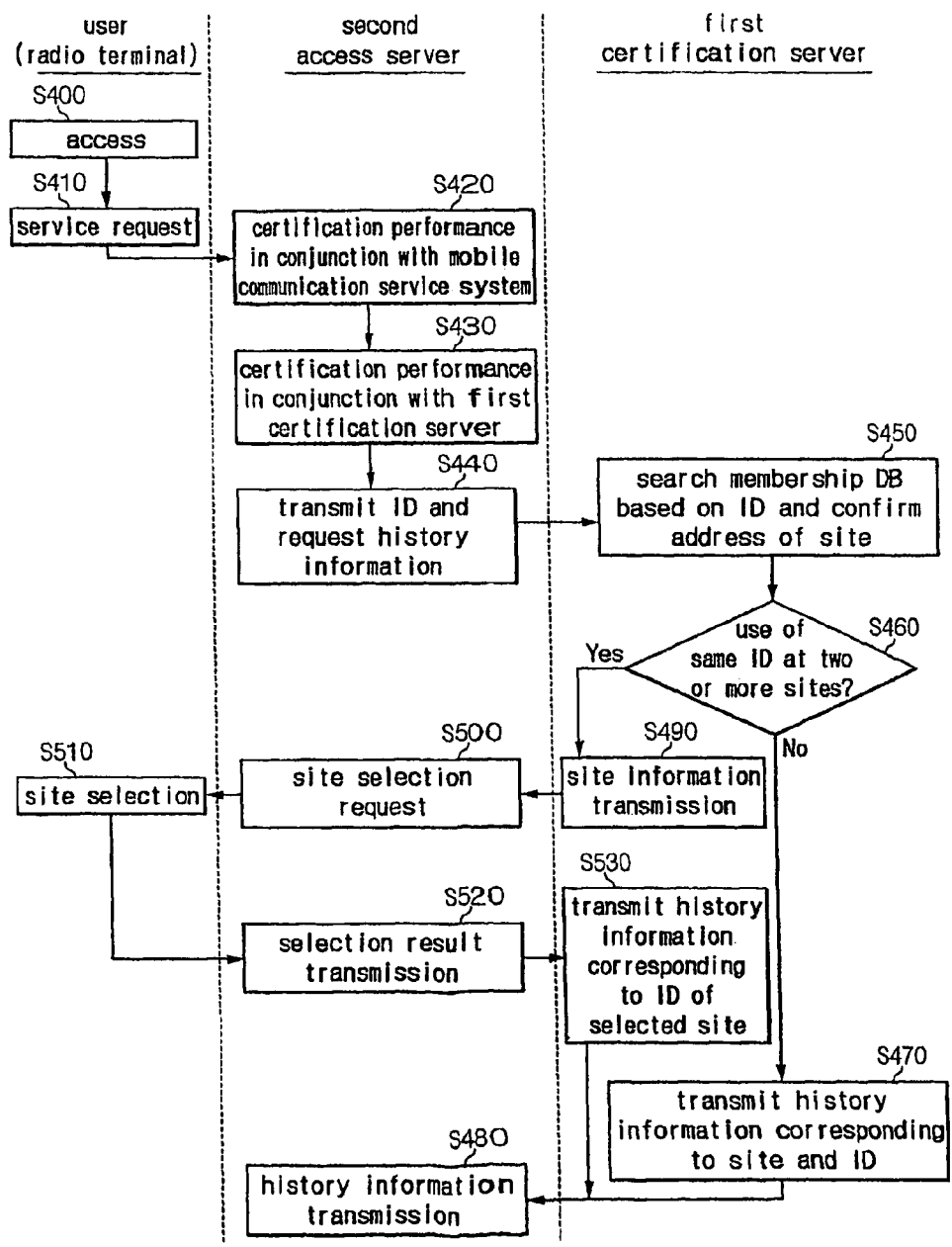
FIG. 5 is a flow chart of a certification method according to another embodiment of the present invention.

FIG. 5 illustrates a certification process according to another embodiment of the present invention.

Referring to FIG. 5, when the user who joins as the member in the plurality of web sites accesses the certification system 100 through the WAP and requests the certification system 100 to provide a service of linking the history information on the Web, the second access server 20 performs the primary certification using the identification number of the radio terminal and the resident number of the user and receives the user ID and password from the user for additionally performing certification in conjunction with the first access server 10 (Steps S400 to S430), as described above.

When the user requests the history information on the Web after the certification for the user is performed, the second access server 20 transmits the user ID to the first access server 10 and requests the server 10 to provide the history information (Step S440).

Based on the transmitted user ID, the first access server 10 searches the membership database 31 to confirm an address of a web site in which the ID and password are registered (Step S450), searches the first log database 51 based on the web site address to read out the history information which corresponds to the ID of various history information corresponding to the web site address, and then transmits the read history information to the second access server 20 (Step S460 and S470). Accordingly, the second access server 20 provides the transmitted history information to the radio terminal 400 of the user (Step S480).

On the other hand, if the user uses the same ID in two or more web sites, the first access server 10 provides addresses of web sites corresponding to the ID, which is inputted by the user, to the radio terminal 400 of the user through the second access server 20 to allow the user to select a desired web site desired (Step S490 and S500). In this case, the user may request the history information of all web sites corresponding to the ID or may select one or more web sites (Step S510).

When an identification number of the web site selected by the user through the second access server 20 is provided to the first access server 10, the first access server 10 transmits the history information which corresponds to the web site from the first log database 51 to the second access server 20, which in turn provides the history information to the user (Steps S510, S520, 530, and 480).

According to this embodiment, even when the user joins as a member in the plurality of web sites, he can easily receive the history information by accessing the certification system through the WAP.

On the other hand, in the above-described embodiments, when information on the user for whom the primary and secondary certifications are completed is stored in the certification user database 44, a service can be provided to the user without performing the certification process when the user accesses the certification system 100 through the WAP.

The certification processes according to the above-described embodiments can be implemented in the form of a program stored in a recording medium such as a hard disk, a CD-ROM, a floppy disk, and the like.

Although the preferable embodiments of the present invention have been illustrated so far, it should be understood that modifications, changes, and alterations to the embodiments are possible without deviating from the spirit and scope of the invention. For example, while the resident number is used as the first identification information of the user and the ID is used as the second identification information in the preferable embodiments, other numbers or information may be also used as the first or second identification information.

Therefore, the scope of the present invention should not be defined by the above embodiments, but by the attached claims and equivalents to the claims.

As is apparent from the above description, according to the present invention reliable certification for users accessing a system through a radio network can be performed, which results in a safe service.

Particularly, in addition to the certification using a telephone number of a radio terminal, by additionally performing the certification using user identification information (ID, passwords, and the like) granted on the Web, an unauthorized person can be effectively prevented from requesting a service using the radio terminal of the user.

What is claimed is:

1. A certification system connected to a radio communication system, comprising:
    a device configured to perform a first certification based on first identification information received via the radio communication system from a radio terminal connected to a radio network; and
    a second access server connected to a first network and to the radio network, the second access server configured to acquire the first identification information and to perform a second certification based on second identification information received via the radio network from the radio terminal,
    wherein the second access server selectively provides information requested by the radio terminal, the requested information being from the first network, to the radio terminal via the radio network based on the first and second certifications, the first identification information comprises a registration number, and the second identification information comprises an ID and password registered in the certification system.

2. The certification system of claim 1, further comprising a first access server to receive requests for certification from the first network.

3. The certification system of claim 2, further comprising a second certifying unit configured to acquire the first identification information from the second access server for transmission to the device.

4. The certification system of claim 3, wherein the device comprises a database, the device to determine whether the first identification information matches information stored in the database comprising information descriptive of a plurality of radio terminals.

5. The certification system of claim 4, further comprising a first processor configured to grant a temporary identification code to the radio terminal and to store the temporary identification code in correspondence with the first identification information after the first certification is performed.

6. The certification system of claim 5, further comprising a second processor configured to change the temporary identification code to information comprising at least a portion of the second identification information.

7. The certification system of claim 3, wherein the second certifying unit transmits a message to the radio terminal identified in the second identification information and requires a response from it.

8. The certification system of claim 1, further comprising a first certification server configured to perform certification of a request received by the second access server from the first network.

9. The certification system of claim 8, further comprising a first certifying unit configured to acquire the second identification information from the second certification server and to perform secondary certification.

10. The certification system of claim 9, further comprising a membership database that is configured to store the second identification information and to respond to certifications required by the radio network or the first network.

11. The certification system of claim 9, further comprising:
    a first log database comprising information selectively provided about activities that is stored corresponding to the first identification information; and
    a second log database comprising information selectively provided about activities that is stored corresponding to the second identification information,
    wherein the second access server provides the information stored in the first log database and the second log database to the radio terminal in accordance with the second identification information.

12. The certification system of claim 11, further comprising:
    a settlement server to perform settlement using money charged in a settlement account for a service provided through the second access server that requires payment, wherein the information stored in the first log database comprises information indicative of the settlement account.

13. The certification system of claim 9, further comprising a membership database configured to store the second identification information and an identification number of a web site in which the second identification information is registered,
    wherein the information for each web site is stored in a first log database in correspondence to the second identification information.

14. The certification system of claim 1, wherein the first identification information is different than the second identification information.

15. The certification system of claim 1, wherein the first certification is different than the second certification.

16. A method of certifying a radio terminal, the method comprising:
    (a) receiving first identification information and an identification number of the radio terminal, which is configured to access a certification system through a radio network and to request a service;

(b) transmitting the first identification information and the identification number of the radio terminal to a mobile communication system;

(c) requesting the mobile communication system to perform primary certification;

(d) receiving second identification information and performing secondary certification based on the second identification information; and (e) providing a requested service, the requested service being from the first network, to the radio terminal via the radio network after the primary certification and the secondary certification are successfully performed, wherein the first identification information comprises a registration number, and the second identification information comprises an ID and password registered in the certification system.

17. The method of claim 16, wherein step (d) comprises processing certification requests by accessing the certification system through a first network based on the second identification information.

18. The method of claim 16, wherein step (e) comprises providing information about activities performed after accesses of the certification system through a first network and providing information on activities performed after the certification system was accessed through the radio network by the radio terminal.

19. The method of claim 16, wherein step (c) comprises granting a temporary identification number to the radio terminal when the mobile communication system informs the certification system of a result of the certification for the radio terminal and storing the temporary identification number in a certification user database in correspondence to the first identification information and the identification number of the radio terminal, wherein step (d) comprises changing the temporary identification number stored in the certification user database to the second identification information after the secondary certification is performed based on the second identification information, and wherein step (e) comprises providing information to the radio terminal based on the second identification information.

20. The method of claim 16, wherein the first identification information is different than the second identification information.

21. The method of claim 16, wherein the first certification is different than the second certification.

* * * * *